US007880409B2

(12) United States Patent
Miller

(10) Patent No.: US 7,880,409 B2
(45) Date of Patent: Feb. 1, 2011

(54) REMOVABLE POWER SUPPLY FOR A MOTORIZED SHUTTER ASSEMBLY

(75) Inventor: James V. Miller, Itasca, IL (US)

(73) Assignee: Qualitas Manufacturing Inc., Itasca, IL (US)

( * ) Notice: Subject to any disclaimer, the term of this patent is extended or adjusted under 35 U.S.C. 154(b) by 787 days.

(21) Appl. No.: 11/230,210

(22) Filed: Sep. 19, 2005

(65) Prior Publication Data

US 2007/0065138 A1 Mar. 22, 2007

(51) Int. Cl.
H02K 7/14 (2006.01)
H02J 7/00 (2006.01)
E06B 9/32 (2006.01)

(52) U.S. Cl. .................... 318/17; 160/168.1 P; 307/150

(58) Field of Classification Search .................. 396/301; 318/17; 307/150; 160/168.1 P; 294/19.1
See application file for complete search history.

(56) References Cited

U.S. PATENT DOCUMENTS

| 5,671,550 | A | * | 9/1997 | Westelaken | .................. 34/167 |
| 6,104,162 | A | * | 8/2000 | Sainsbury et al. | ............ 320/111 |
| 6,910,515 | B2 | * | 6/2005 | Nien | ..................... 160/168.1 P |
| 7,204,650 | B2 | * | 4/2007 | Ghanouni et al. | ............ 396/420 |
| 2003/0090162 | A1 | * | 5/2003 | Cornog et al. | .............. 307/150 |
| 2005/0011616 | A1 | * | 1/2005 | Nien | .................... 160/168.1 R |

* cited by examiner

*Primary Examiner*—W. B. Perkey
(74) *Attorney, Agent, or Firm*—Ice Miller LLP

(57) ABSTRACT

A removable power supply is provided for use with a motor of a shutter assembly. The removable power supply may include a base housing a battery, a shaft, and a flexible conductor coupled between the base and the shaft. The end of the shaft opposite of the flexible conductor has an electrical interface that is configured to supply power to the motor. The electrical interface is configured for removable coupling to the motor. The shaft may comprise a plurality of telescoping sections, or may be a unitary member. The telescoping sections may be a series of interlocking hallow tubes. The removable power supply may supply power to the motor, thereby allowing a shutter curtain of the assembly to be raised or lowered. Once the shutter curtain is at the desired position, the removable power supply may be removed from the shutter assembly.

18 Claims, 6 Drawing Sheets

REMOVABLE POWER SUPPLY FOR A MOTORIZED SHUTTER ASSEMBLY

BACKGROUND OF THE INVENTION

1. Technical Field

The present invention relates generally to a shutter assembly. In particular, the invention relates to a system and method for providing power to a motorized shutter assembly.

2. Background of the Invention

Shutter assemblies are frequently employed to cover an aperture in a wall, such as for example, a window or an entryway, and to provide security and/or protection from weather, intruders, and the like. The shutter assembly typically includes a shutter curtain formed from a plurality of interlocking slats. When a user wishes to expose the wall aperture, the shutter curtain is raised by winding the interlocking slats about a rotatable drive tube. When a user wishes to cover the wall aperture, the shutter curtain is lowered by rotating the drive shaft to unroll the interlocking slats.

A number of mechanisms are available for winding and unwinding the shutter curtain. One known type of manual shutter assembly includes a gearing system to raise and lower the shutter curtain. The gearing system typically includes a driving gear, such as for example a worm gear, and a driven gear, such as for example a spur gear. The driven gear is typically coupled to the drive tube such that rotation of the driven gear results in a linear rotation of the drive tube. The driving gear is adapted to receive a first shaft of a universal joint while a second shaft of the universal joint is adapted to be couple to a crank pole. The gear assembly typically includes an indexing mechanism to provide a positive stop when the shutter curtain is in a fully lowered position so that the operator does not inadvertently roll the shutter curtain back up again. In operation, the crank pole is used to rotate the universal joint thereby rotating the driving gear. The rotating driving gear rotates the driven gear which in turn rotates the drive tube thereby raising or lowering the shutter curtain.

During the raising and lowering operations of the shutter curtain using the above described manual shutter operator, the articulated joints of the universal joint may be subjected to significant pressure making them more prone to failure. The more acute the angle of operation of the crank pole, the greater the stress experienced at the joints. Also, often times there is a large gear ratio between the driving gear and the driven gear requiring the operator to rotate the crank pole numerous times to fully raise or lower the shutter curtain. For example, a gear assembly with an eleven-to-one gear ratio requires the operator to rotate the crank pole eleven times in order to turn the drive tube once. It can often be tiring and/or time consuming for a user to raise or lower the shutter curtain on such a shutter assembly, especially when the user is raising or lowering several such shutter curtains. Furthermore, a user may not be able sense the difference between the indexing mechanism's positive stop and the torque required to raise the shutter curtain. As a result, the shutter curtain may be inadvertently back-rolled by the user, which may cause damage to the shutter curtain and/or its associated hardware.

Another known type of shutter curtain implements a motor assembly unit to rotate the crank pole, which in turn rotates the universal joint. The rotation of the universal joint causes a rotation of the driving gear which in turn rotates the driven gear. The rotating driven gear rotates the drive tube to lower and/or raise the shutter curtain. Such a motor assembly unit can be heavy and cumbersome because it typically houses both a motor and a battery to power the motor. A user has to support and balance the weight of the unit, and also act as a counterbalance to the torque produced by the motor to drive the crank pole to raise and/or lower the shutter curtain. The use of such a motor assembly unit may also increase the likelihood of universal joint failure.

Yet another known type of shutter curtain assembly implements a tubular motor assembly to essentially directly rotate the drive tube. The tubular motor assembly is typically affixed to the shutter curtain end cap or bracket assembly. The tubular motor is typically inserted into the drive tube of the shutter assembly, and may include a plurality of reduction gears and a counting mechanism to track the appropriate number of rotations necessary to stop the shutter curtain in at the desired position. A further known type of shutter curtain assembly incorporates a motor assembly into an end cap of the shutter curtain assembly. In each of these motorized shutter curtain assemblies, some form of power is required to drive the motor. It would be desirable to provide a motorized shutter assembly that does not require a permanent electrical connection to provide power to the motor.

SUMMARY

A removable power supply is provided for use with a motor of a shutter assembly. The removable power supply may include a base housing a battery, a shaft, and a flexible conductor coupled between the base and the shaft. The end of the shaft opposite of the flexible conductor has an electrical interface that is configured to supply power to the motor. The electrical interface is configured for removable coupling to the motor.

The shaft may comprise a plurality of telescoping sections, or may be a unitary member. The telescoping sections may be a series of interlocking hallow tubes. The removable power supply may supply power to the motor, thereby allowing a shutter curtain of the assembly to be raised or lowered. Once the shutter curtain is at the desired position, the removable power supply may be removed from the shutter assembly.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention can be better understood with reference to the following figures. The components in the figures are not necessarily to scale; emphasis is instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
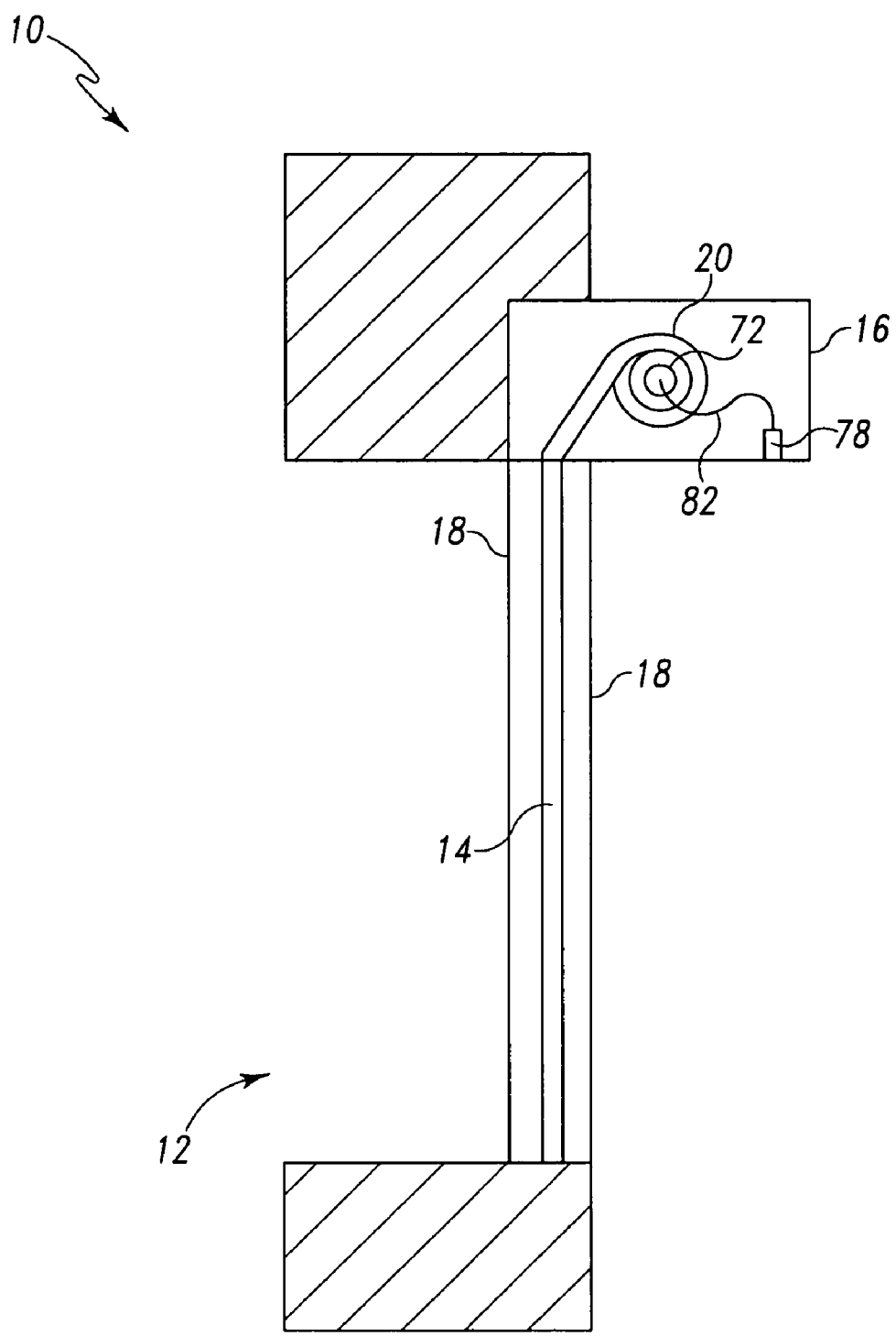
FIG. 1 is a cross-sectional view of a shutter assembly installed over an aperture of a structure.

FIG. 1 is a cross-sectional view of a first illustrative embodiment of a shutter assembly 10 installed over an aperture 12 of a structure. The structural aperture 12 may be a door or a window of a building or a large vessel (such as a ship or a truck), an entrance to a loading dock, or a similar aperture. In FIG. 1, the shutter assembly 10 is shown installed mounted to the "outside" of a wall containing the aperture 12. In other embodiments, the shutter assembly 10 may be mounted within the wall containing the aperture 12, as is well known in the art. The mounting location of the shutter assembly 10 is not critical to the invention disclosed and claimed herein, and the mounting location shown in FIG. 1 is merely illustrative, and is not intended to limit the claimed invention in any way.

The shutter assembly 10 may generally include a shutter curtain 14, a shutter housing 16, a pair of shutter guide tracks 18, a motor 72, and a roller drive tube 20. The shutter curtain 14 may consist of a plurality of interconnected slats, as is well known in the art. The shutter housing 16 is shown as a rectangular tube, however other shapes and styles of shutter housings are known to those of skill in the art, and the square housing 16 is used herein for illustrative purposes only. The invention described and claimed herein may be used with practically any shape of shutter housing.

The roller drive tube 20 is rotatably mounted within the shutter housing 16. The roller drive tube 20 may include a free end and a driven end. The free end of the roller drive tube 20 may rotate relatively freely with respect to the housing 16. The driven end may be subjected to a torque from the motor 72 via a system of gears and/or other force modifiers. The motor 72 may receive power from an electrical interface 78 via a conductor 82. The motor 72 may be a low-voltage direct current (DC) motor, a high-voltage (greater than about 120 volts) alternating current (AC) motor, or the like. In one preferred embodiment, the motor 72 is of the low-voltage (less than about 36 volts) DC variety, and draws a relatively low current of less than about 20 amperes. The electrical interface 78 is described in more detail below.

The mounting location of the motor 72 is not critical to the invention disclosed and claimed herein, and the mounting location shown in FIG. 1 is merely illustrative. For other types of shutter assemblies, the motor 72 may be mounted internally to the shutter assembly housing 16, on an end of shutter assembly housing 16, or on the wall where the shutter assembly housing 16 is inside the wall or on the opposite side of the wall. The motor 72 may be mounted in any orientation and location desired so that a mechanical force transference mechanism (such as a shaft) is able to be configured to transfer torque from the motor 72 to the roller drive tube 20 of the operated shutter assembly 10.

Figure 2:
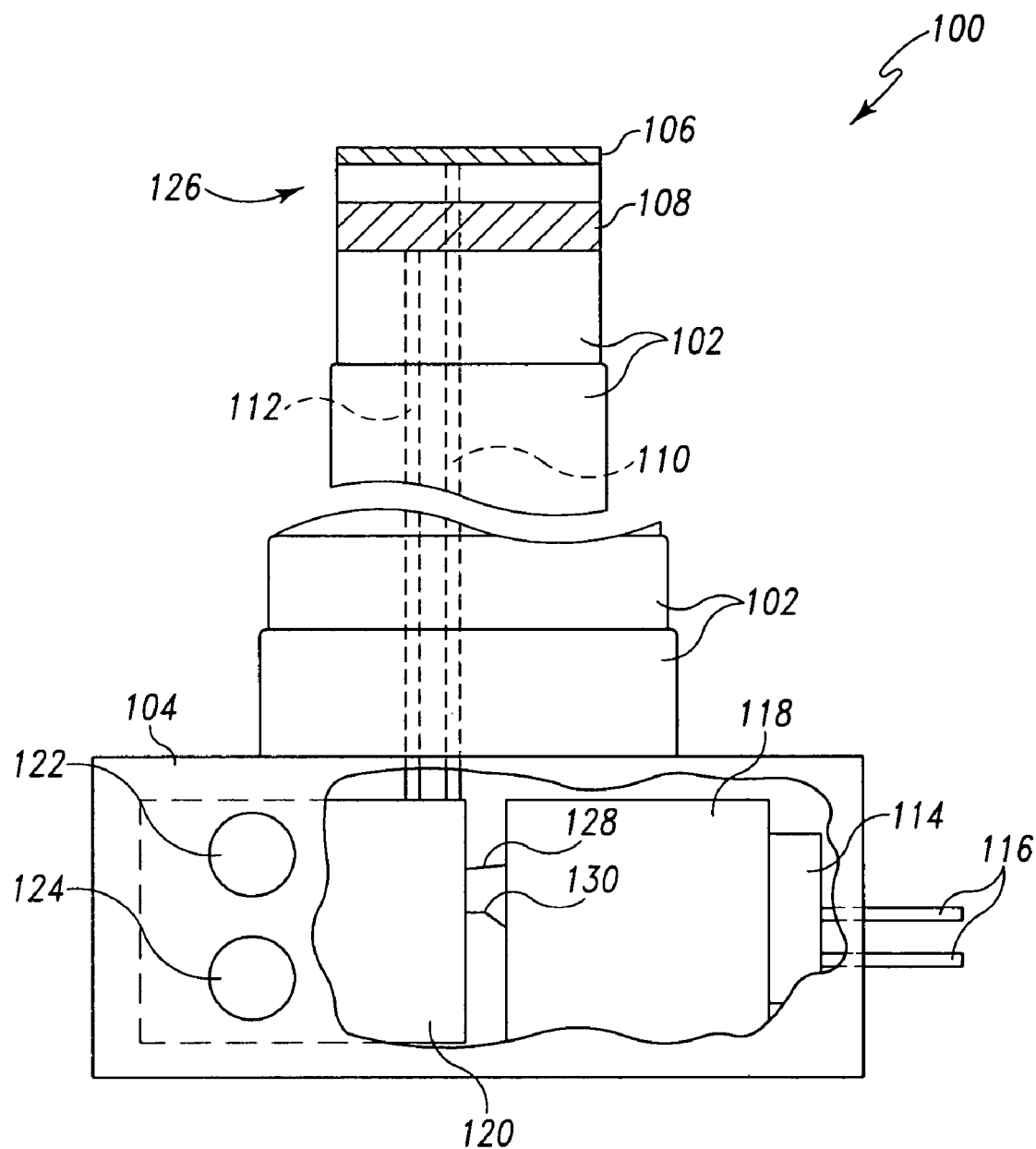
FIG. 2 is a cutaway side view of a first illustrative removable power supply for use with the shutter assembly of FIG. 1.

FIG. 2 is a cutaway side view of a first embodiment of a removable power supply 100 for use with the motor 72. The removable power supply 100 may include a plurality of telescoping sections 102. The telescoping sections 102 may be coupled to an electrical interface 126 at one end and to a base 104 at the opposite end. The plurality of telescoping sections 102 may be a series of interlocking hallow tubes that allow the electrical interface 126 to be separated a distance from the base 104. The interior of the plurality of telescoping sections 102 may have a first conductor 110 and a second conductor 112 affixed thereto, so that power can be conducted from the base 104 to the electrical interface 126.

The electrical interface 126 is configured to be removably coupled to the electrical interface 78 of the shutter assembly 10. In the illustrative embodiment of the electrical interface 126 shown in FIG. 2, a tubular removable connector is shown with a first contact circumscribing a portion of the interface and a second contact covering all or a portion of the end of the interface. While the configuration of the electrical interface 126 shown in FIG. 2 is merely illustrative, this configuration is well suited use with a removable power supply, such as a battery pack. While in the embodiment shown in FIG. 2 the electrical interface 126 is configured as a plug, in other embodiments the electrical interface 126 may take on other forms without departing from the scope of the claimed invention.

The base 104 may include a battery charging circuit 114 electrically coupled to a battery 118, and a switching circuit 120. The switching circuit 120 may be electrically coupled to the first and second conductor 110 and 112. Additionally, the switching circuit 120 may be coupled via conductors 128 and 130 to the battery 118. The charging circuit 114 may have an electrical interface 116 for receiving power from an external source. The charging circuit 114 may be operative to condition the received power and to charge the battery 118. The switching circuit 120 may include a first switch 122 and a second switch 124.

In a first operational state, the removable power supply 100 is coupled to an external power source, and the charging circuit 114 charges the battery 118. In a second operational state, the removable power supply 100 is removed from the external power source, and removably coupled via the electrical interface 126 to the electrical interface 78 of the shutter assembly 10. In the second state, activation of the first switch 122 will provide DC power of a first polarity to the motor 72, thereby activating the motor 72 and lowering the shutter 14. Additionally in the second state, activation of the second switch 124 will provide DC power of a second polarity to the motor 72, thereby activating the motor 72 and raising the shutter 14.

The embodiment the removable power supply 100 shown in FIG. 2 and described above is merely illustrative, and is not intended to limit the claimed invention in any way. For example, the plurality of telescoping sections 102 can be removed so that the electrical interface 126 is more directly coupled to the base. Additionally, the charging circuit 114 could be external to the removable power supply 100, thereby reducing weight. Additionally, the battery 118 could be either a rechargeable battery pack, or a plurality of consumer-type disposable batteries (such as those used in portable radios and children's toys).

Figure 3:
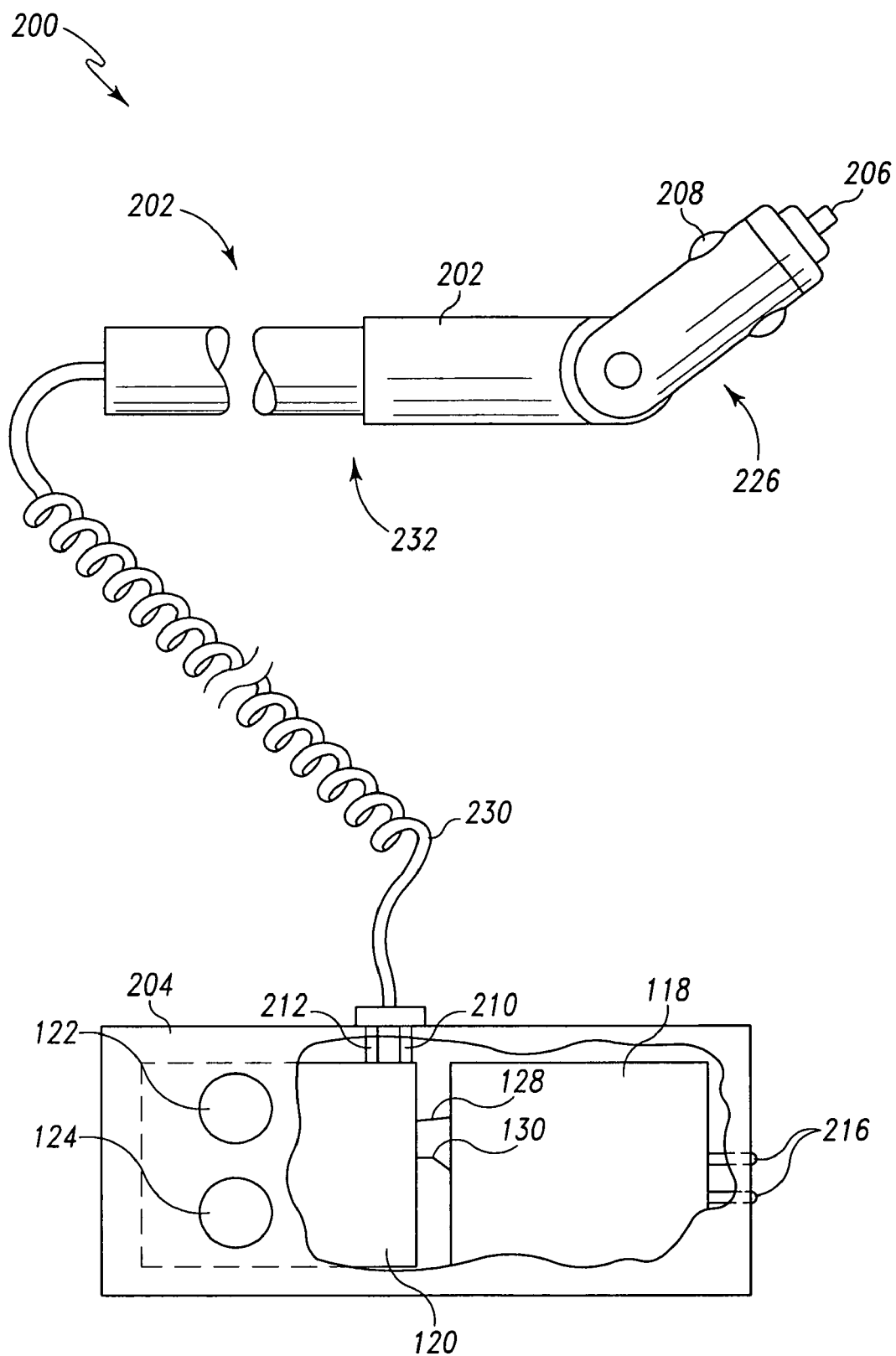
FIG. 3 is a cutaway side view of a second illustrative removable power supply for use with the motor assembly of FIG. 4.

FIG. 3 is a cutaway side view of a second embodiment of a removable power supply 200 for use with the motor 72. The removable power supply 200 may include a shaft 232. The shaft 232 may comprise a plurality of telescoping sections 202, as shown in FIG. 3. The plurality of telescoping sections 202 may be a series of interlocking hallow tubes. Alternatively, the shaft 232 could be a unitary member, such as a tube. The shaft 232 may be coupled to an electrical interface 226 at one end and to an electrical cord 230 at the other end. The electrical cord 230 may electrically couple the shaft 232 to the base 104. The shaft 232 and the electrical interface 226 may allow the electrical interface 226 to be separated a distance from the base 104. The interior of the plurality of shaft 232 may include conductors (not shown), so that power can be conducted from the base 104, through the electrical cord 230, and to the electrical interface 226.

The electrical interface 226 is configured to be removably coupled to the electrical interface 78 of the shutter assembly 10. In the illustrative embodiment of the electrical interface 226 shown in FIG. 3, a "cigarette lighter" style of connector, similar to those used for automobile radar detectors and cellular telephone chargers, is shown with a first contact 208 on the side of the interface 226 and a second contact 206 extending from the end of the electrical interface 226. While the configuration of the electrical interface 226 shown in FIG. 3 is merely illustrative, this configuration is well suited use with a removable power supply, such as a battery pack. As shown in FIG. 3, the electrical interface 226 may be capable of being rotated about a pivot point, so that the angle between the electrical interface 226 and the shaft 232 may be adjusted from less than ninety degrees to one-hundred and eighty degrees. Changing the angle between electrical interface 226 and the shaft 232 may provide for more convenient use of the removable power supply 200.

The base 204 of the removable power supply 200 may include the battery 116, and a switching circuit 120, which operate in the same manner as in the base 104 of the removable power supply 100. The switching circuit 120 may be electrically coupled to a first and second conductor 210 and 212. Additionally, the switching circuit 120 may be coupled via conductors 128 and 130 to the battery 118. The battery 116 may have an electrical interface 216 for receiving a charging power from an external source, such as a battery charger (not shown), as is known in the art. The switching circuit 120 may include a first switch 122 and a second switch 124.

In a first operational state, the removable power supply 200 is coupled to an external power source, which charges the battery 118. In a second operational state, the removable power supply 200 is removed from the external power source, and removably coupled via the electrical interface 226 to the electrical interface 78 of the motor 72. In general, the removable power supply 200 operates in the same manner as the removable power supply 100, as described above.

Many configurations of the removable power supply 100 could be implanted, and each is contemplated to be within the scope of the invention described and claimed herein. For example, the motor 72 could be adapted to have a connecting port for a power connection on a pole or other assembly. This pole could be coupled to an extension cord, so that AC power can be quickly supplied to the motor 72. This may reduce the costs of redundant power systems and wiring, and would allow for easy attachment and operation of the shutter from locations where permanent power connection is not desirable or practical.

Figure 4:
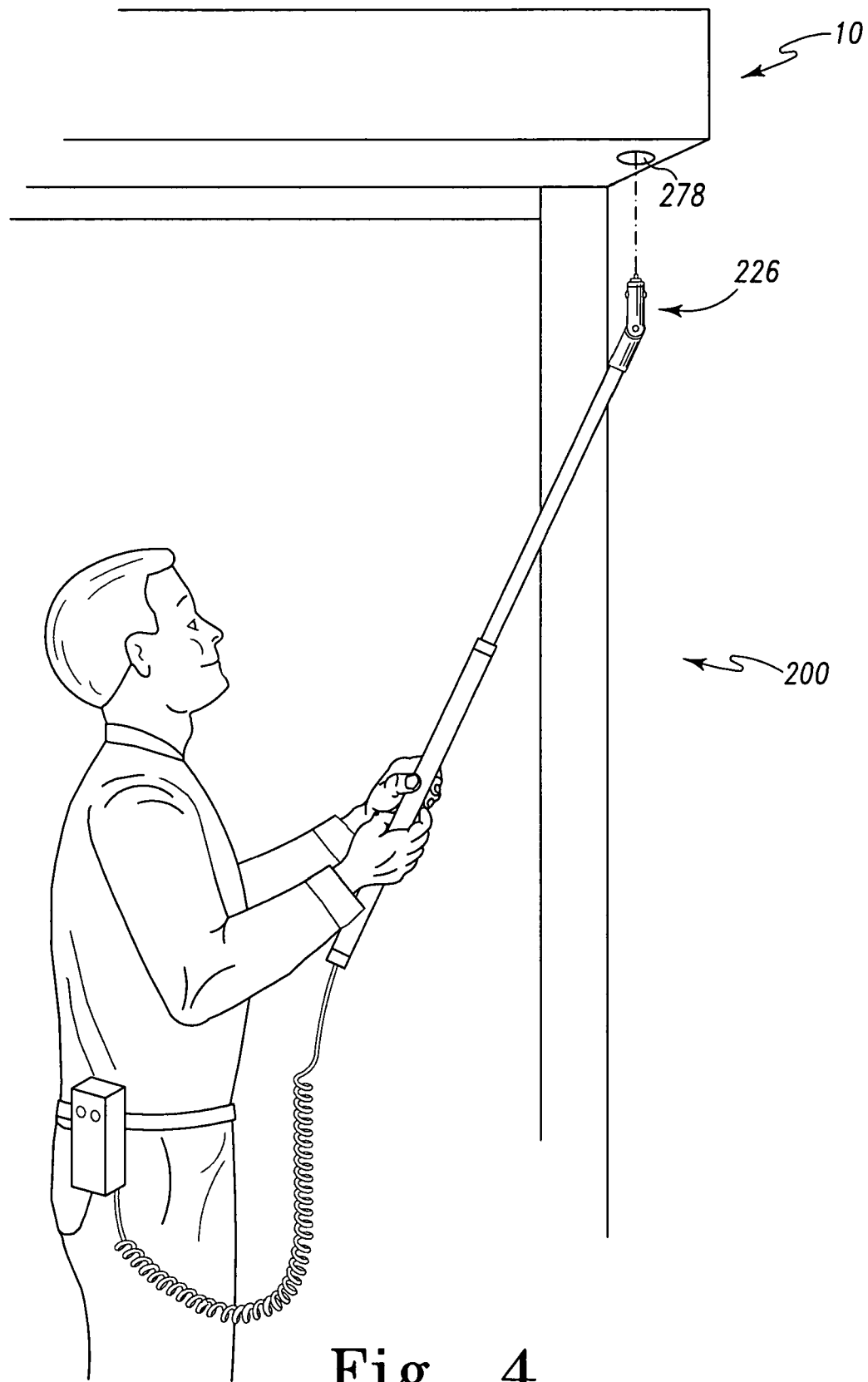
FIG. 4 is a perspective view of the second illustrative removable power supply of FIG. 3 being used with an illustrative shutter assembly.

Turning to FIG. 4, an operator is shown using the removable power supply 200 to operate a first embodiment of the shutter assembly 10. The operator first aligns the electrical interface 226 of the removable power supply 200 with the electrical interface 78 of the motor 72. (The electrical interface 78 is not shown, but is accessible via the port 278 in the shutter housing 16.) Then, the operator inserts the electrical interface 226 of the removable power supply 200 into electrical interface 78, thereby coupling the switching circuit 120 to the motor 80. Next, the operator activates either the first switch 122 or the second switch 124, which causes a current flow to the motor 80. The current flow causes the motor 80 to either raise or lower the shutter curtain 14, depending on whether the first switch 122 or the second switch 124 is activated. Finally, when the shutter curtain 14 is in the desired position, the operator deactivates the first switch 122 or the second switch 124 and removes the electrical interface 226 of the removable power supply 200 from electrical interface 78.

In the embodiment of the shutter assembly 10 shown in FIG. 4, the motor 72 is located inside of the shutter housing 16. As explained above, it is within the scope of the claimed invention to locate the motor 72 inside the shutter housing 16, outside the shutter housing 16, or completely separate from the shutter housing 16. The claimed invention does not require a shutter housing 16, although in most applications the inclusion of a shutter housing 16 may be desirable.

Figure 5:
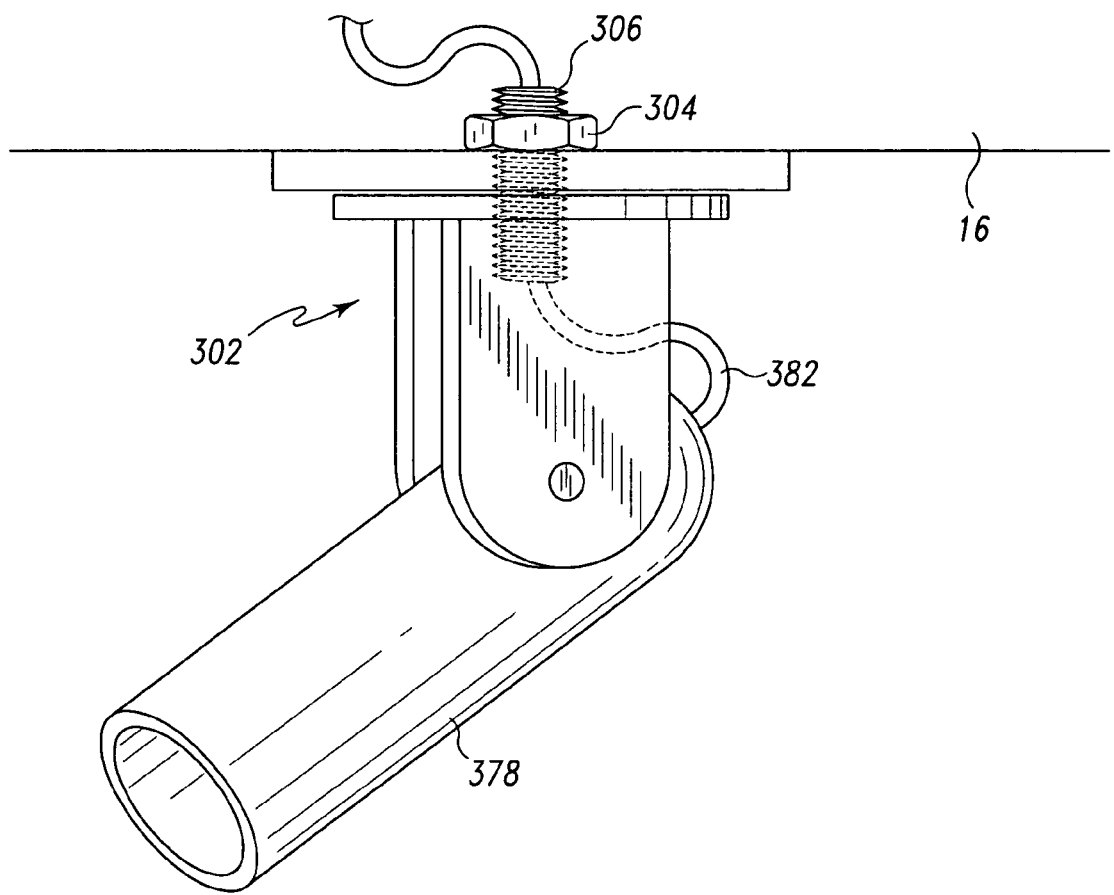
FIG. 5 is a perspective view of a power socket for a shutter assembly that is configured for receiving power from a removable power supply.

Turning to FIG. 5, an illustrative embodiment of the electrical interface 78 is shown as an external electrical interface 378. The illustrative embodiment of the external electrical interface 378 is shown as a "cigarette lighter" style of port having a first contact circumscribing a portion of the port and a second contact covering all or a portion of the end of the port opposite the opening, as is well known in the art. While the configuration of the electrical interface 378 shown in FIG. 5 is merely illustrative, this configuration is well suited for an embodiment using the removable power supply 200 shown in FIG. 4 or an embodiment using the removable power supply 300 shown in FIG. 6.

The external electrical interface 378 is coupled to the shutter housing 16 via an adjustable mounting 302. The adjustable mounting may have a rotatable base and a pivot mount as shown, or may be some other configuration allowing the external electrical interface 378 to be repositioned relative to the shutter housing 16. The external electrical interface 378 may be coupled to the shutter housing 16 by a hollow fastener 306 and a nut 304. A conductor 382 conducts power between the external electrical interface 378 and the motor 72.

Figure 6:
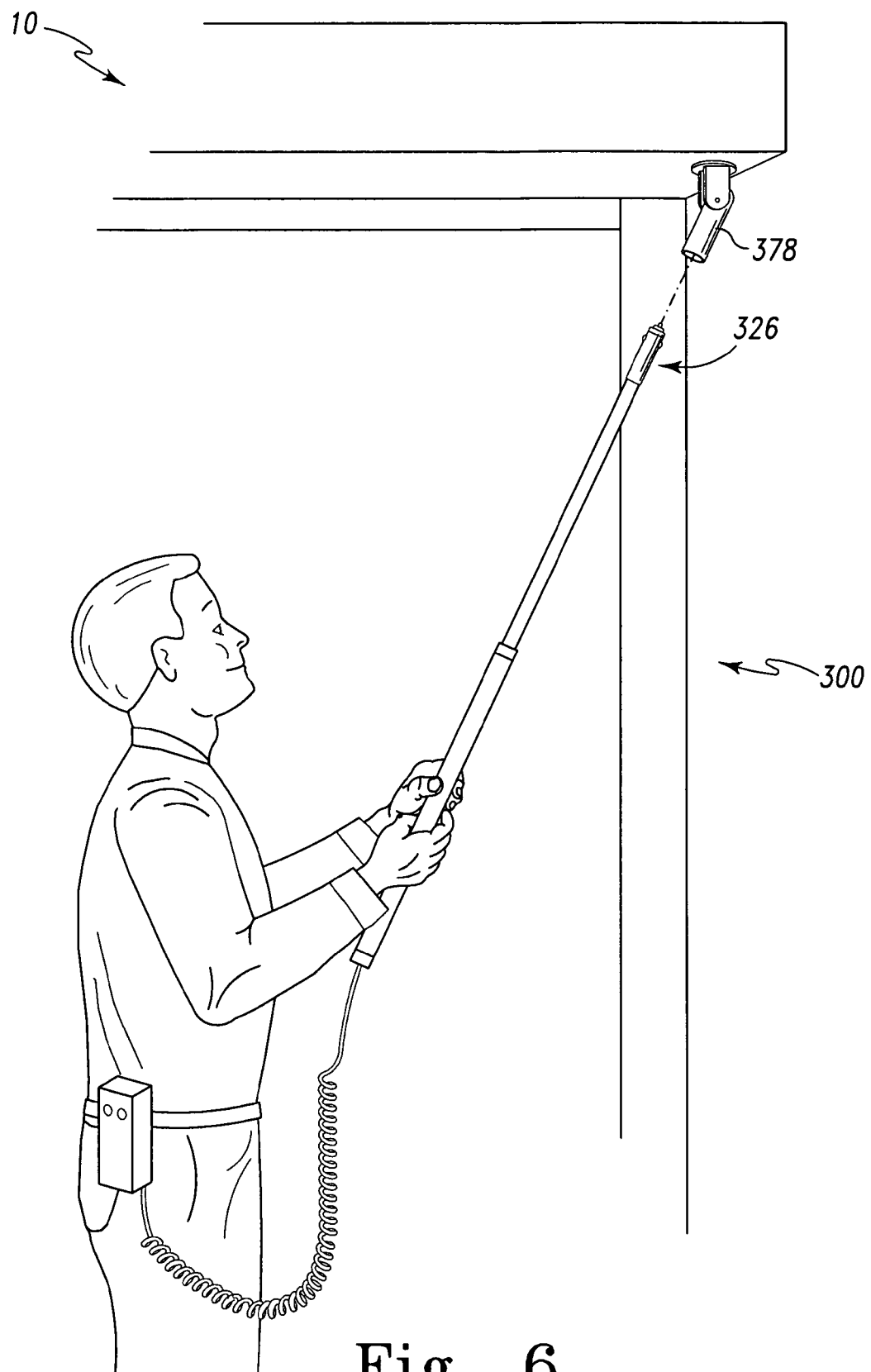
FIG. 6 is a perspective view of a third illustrative removable power supply being used with an illustrative shutter assembly that includes the power socket of FIG. 5.

Turning to FIG. 6, an operator is shown using a removable power supply 300 to operate a second embodiment of the shutter assembly 10, which is equipped with the external electrical interface 378. The removable power supply 300 is essentially the same as the removable power supply 200, but with a fixed-position electrical interface 326 rather than the pivoting electrical interface 226 found in the removable power supply 200. While the removable power supply 300 is shown in FIG. 6, the removable power supply 200 is also suited for use with the external electrical interface 378.

The operator first aligns the electrical interface 326 of the removable power supply 300 with the electrical interface 278. Then, the operator inserts the electrical interface 326 of the removable power supply 300 into electrical interface 378. For certain installations where the shutter assembly 10 is in a hard-to-reach space, it may be easier for the operator to couple the electrical interface 326 to the electrical interface 378 because the external electrical interface 326 is straight. Once the shutter curtain 14 is in the desired position, the removes the electrical interface 326 of the removable power supply 300 from electrical interface 378.

Several other configurations for the shutter assembly 10 are also within the scope of the claimed invention. For example, in one embodiment the battery 118 is installed in an electrical switch housing (such as a jack box for a power outlet) and may be made to recharge as a unit, or, alternatively, the battery 118 may be removed from the base 104 for charging in an electrical switch housing. In another embodiment, the batter 118 is configured for temporary mounting in a recessed mount installation within a wall.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A removable power supply for use with a motor of a shutter assembly, the removable power supply comprising:
   a base;
   a battery coupled to the base;
   a shaft coupled to the base;
   an electrical interface coupled to the shaft;
   a flexible conductor coupled between the base and the shaft, wherein the flexible conductor allows the shaft to be located a variable distance away from the base;
   a switching circuit electrically coupled between the battery and the flexible conductor;
   wherein the electrical interface is configured to be removably coupled to a motor of a shutter assembly, and the battery is configured to provide power to the motor.

2. The removable power supply of claim 1, comprising a second conductor electrically coupled between the electrical interface and the flexible conductor.

3. The removable power supply of claim 1, wherein the flexible conductor is electrically coupled between the electrical interface and the battery.

4. The removable power supply of claim 1, comprising a battery charging circuit electrically coupled to the battery.

5. The removable power supply of claim 4, wherein the battery charging circuit comprises a second electrical interface configured for receiving power.

6. A removable power supply for use with a motor of a shutter assembly, the removable power supply comprising:
   a base;
   a battery coupled to the base;
   a shaft coupled to the base, wherein the shaft has a length greater than about 50 centimeters;
   an electrical interface coupled to the shaft;
   a flexible conductor coupled between the base and the shaft, wherein the flexible conductor allows the shaft to be located a variable distance away from the base;
   a switching circuit electrically coupled between the battery and the flexible conductor;
   wherein the electrical interface is configured to be removably coupled to a motor of a shutter assembly, and the battery is configured to provide power to the motor.

7. The removable power supply of claim 1, wherein the electrical interface is pivotably coupled to the shaft, such that the electrical interface may be directed at a variable angle from the shaft.

8. The removable power supply of claim 1, wherein the shaft comprises a plurality of telescoping sections.

9. The removable power supply of claim 8, wherein the plurality of telescoping sections is a series of interlocking hollow tubes.

10. The removable power supply of claim 1, wherein the shaft is a unitary member.

11. The removable power supply of claim 10, wherein the unitary member is a tube.

12. The removable power supply of claim 1, wherein the battery provides power at a voltage between about six volts and 36 volts.

13. The removable power supply of claim 1, wherein the input electrical interface comprises a plug having a first electrical connector and a second electrical connector.

14. The removable power supply of claim 13, wherein the plug is cylindrical.

15. The removable power supply of claim 1, comprising a battery charging circuit electrically coupled to the battery.

16. The removable power supply of claim 1, wherein the shaft has a length of between about 25 centimeters and 50 centimeters.

17. The removable power supply of claim 1, wherein the shaft has a length of between about 50 centimeters and 75 centimeters.

18. The removable power supply of claim 1, wherein the shaft has a length greater than about 75 centimeters.

* * * * *